United States Patent [19]

Zampiello

[11] 4,329,057

[45] May 11, 1982

[54] LASER GYRO OSCILLATION SUPPRESSION

[75] Inventor: Albert N. Zampiello, Boxboro, Mass.

[73] Assignee: Raytheon Company, Lexington, Mass.

[21] Appl. No.: 176,725

[22] Filed: Aug. 4, 1980

Related U.S. Application Data

[63] Continuation of Ser. No. 938,669, Aug. 31, 1978, abandoned.

[51] Int. Cl.³ .................................................. G01C 19/64
[52] U.S. Cl. ........................................ 356/350; 372/29
[58] Field of Search ..................... 331/94.5 T, 94.5 S,
331/94.5 PE; 938/669; 356/350

[56] References Cited

U.S. PATENT DOCUMENTS

| 3,464,024 | 8/1969 | Bell et al. | 331/94.5 T |
| 3,854,819 | 12/1974 | Andringa | 356/350 |
| 3,973,851 | 8/1976 | Ferrar | 356/350 |
| 3,993,965 | 11/1976 | Alves et al. | 331/94.5 T |

Primary Examiner—Vincent P. McGraw
Attorney, Agent, or Firm—Milton D. Bartlett; Joseph D. Pannone; Herbert W. Arnold

[57] ABSTRACT

A laser gyroscope having a multi-frequency ring laser resonator containing a gas laser energized by electric discharge through a gaseous laser medium from two anodes to a common cathode positioned outside the lasing passage and communicating therewith through a narrow bore having a nonuniform constant magnetic field applied to the gaseous discharge in said bore to suppress high frequency gas discharge oscillations in the laser.

10 Claims, 3 Drawing Figures

LASER GYRO OSCILLATION SUPPRESSION

The Government has rights in this invention pursuant to Contract No. F33617-76-C-1218 awarded by the Department of the Air Force.

CROSS-REFERENCE TO RELATED CASES

This is a continuation of application Ser. No. 938,669, filed Aug. 31, 1978, now abandoned.

BACKGROUND OF THE INVENTION

Laser gyroscopes have a gas laser which amplifies electromagnetic waves passing around a common path of a ring defined, for example, by reflecting mirrors. The amplification which results from interaction of the waves with excited states of atoms can produce oscillations at one or more frequencies for waves traveling in the clockwise direction around the laser as well as counterclockwise around the laser.

With a two wave or frequency system, it has been found that, for low rates of rotation corresponding to a small theoretical difference frequency, the actual output difference frequency is zero or substantially less than would be expected due to the phenomena known as lock-in. It is believed that the lock-in problem arises because of coupling between the waves which may arise from a number of possible factors including back scattering of laser energy from elements within the laser path such as mirrors or a polarization dispersive structure or from scattering centers within the laser gain medium itself.

The attempts to compensate for this problem included one proposal in which the two beams are biased at zero rotation away from the zero output level by the use of a Faraday rotator which subjects beams propagating in different directions to different delay times. However, simply biasing the two beams sufficiently far apart to avoid lock-in produced such a large frequency difference between the two beams that the change in frequency caused by ordinary amounts of rotation was rather insignificant compared to the total frequency difference. Thus, any small drift could obliterate the actual desired signal output. Further attempts to achieve biasing included one in which the Faraday rotator was switched from one direction to another using a symmetric AC switching waveform. Such systems have proven somewhat difficult to implement since the symmetry of the AC switching waveform had to be maintained to greater than one part in a million.

The most successful laser gyroscopes yet proposed and constructed employ four waves of two pairs or beams each propagating in opposite directions. Such systems are shown and described in U.S. Pat. Nos. 3,741,657 and 3,854,819 to Keimpe Andringa and assigned to the present assignee, the specifications of those patents being herein incorporated by reference. In such a laser system, circular polarization for the four waves is preferred. The pair of waves propagating in the clockwise direction includes both left-hand and right-hand circularly polarized waves as does the pair propagating in the counterclockwise direction.

Two biasing components are provided. A device such as a crystal rotator produces a delay for circularly polarized waves that is different in one sense or handedness of circular polarization than for the opposite sense and is also reciprocal. That is, a wave traveling in either direction through the crystal will be delayed by the same amount of time. Secondly, a device such as a Faraday rotator is also disposed in the wave path. Such a device is nonreciprocal providing a different time delay for the two directions of propagation. This is achieved by rotating the circular polarization vector by different angles. The delay is independent of the sense of polarization. The result of these biasing operations produces four waves, two with frequencies above the peak of the gain curve of the laser medium and two below. The two above may, for example, both be right-hand circularly polarized while the lower two are left-hand circularly polarized. At a zero rate of rotation, the frequency difference between the left-hand circularly polarized and the right-hand circularly polarized waves are equal. When, for example, the system is rotated in one direction the right-hand circularly polarized waves will move closer together in frequency while the left-hand circularly polarized waves will move apart. The opposite direction of rotation produces the opposite direction of change in frequencies. The actual rotation rate is readily related to the difference between the difference in right-hand circularly and left-hand circularly polarized wave pairs.

In the laser gyroscope systems disclosed in the referenced patents, a structure for adjusting the length of the path through which the four waves propagate to maintain the frequency pairs positioned symmetrically about the center maximum gain frequency of the laser gain medium curve is described. Such symmetric positioning is desired in order to minimize residual drift or lock-in effects.

The gain of the waves passing through the lasing medium is normally a fraction of a percent and must be sufficient to overcome losses in the medium of the ring cavity such as reflection losses at the mirrors and at windows of the gas laser. The gain of the laser can be increased by increasing the discharge current. However, discharge oscillations in the range from a few hertz per second, dependent on power supply constants, to many megahertz are encountered. The megahertz discharge oscillations cannot be prevented by power supply design since they are predominantly a function of the discharge path geometry and the internal negative resistance of the laser tube gas discharge. Such oscillations cause variations in laer amplification so that the laser gyroscope output will be unstable and erroneous. As a result, the laser amplifier in laser gyros needed to be relatively large and operated at low current to prevent gas discharge oscillations so that overall gain would be sufficient to overcome the losses in the ring cavity. In addition, the amount of energy which could be extracted from the ring cavity to drive the output circuitry was generally severely limited, due to the minimal amount of laser amplifier gain.

SUMMARY OF THE INVENTION

In accordance with this invention a laser gyroscope is provided having a gaseous laser amplifier excited by an electrical discharge through a gaseous medium between a pair of anodes and a cathode which are positioned outside the optical path of the laser amplifier, and discharge oscillations are suppressed by a constant magnetic field in the discharge path adjacent the cathode.

More particularly, in accordance with this invention, the laser gyro comprises a ring cavity having a laser amplifier and containing a plurality of reflecting mirrors. One of the mirrors is moved as a function of signals derived from a detector coupled to the laser cavity to control the pathlength of the ring resonator. The laser amplifier has two adjacent regions with the electro excitation discharges going in mutually opposite directions from two anodes to a common cathode communicating with the junction between the two regions through a sidearm tubular bore structure which is also filled with the gaseous medium. A magnetic field provided, for example, by a permanent magnet adjacent to the cathode region and the sidearm bore suppresses high frequency discharge oscillations in the laser gas medium. As a result, the laser discharge current can be increased to a point where the discharge operates stably in the transition region of the voltage current discharge curve of the laser amplifier without substantial oscillations.

This invention further provides that such a laser amplifier system may be made to operate with a very small bore laser which essentially restricts the laser amplification to a single mode thereby further increasing accuracy.

This invention further discloses that a laser gyroscope using discharge oscillation suppression may be operated with pathlength stabilization which is not perturbed by power supply fluctuations and/or internal voltage gradients variation. In addition, such a laser gyro may use structures that avoid frequency locking a low rotation rates by having frequency splitting means to provide a plurality of frequencies of opposite polarization senses with one pair of said frequencies of different circular polarization senses passing in a clockwise direction about said ring laser cavity and another pair of said frequencies of different polarization senses passing in a counterclockwise direction around said ring laser cavity. By subtracting frequencies of the same polarization senses from each other in detectors and then subtracting the resultant difference frequencies from each other, first order effects of temperature variation vibration and/or laser gain shifts can be further reduced.

DESCRIPTION OF THE PREFERRED EMBODIMENTS

Figure 1:
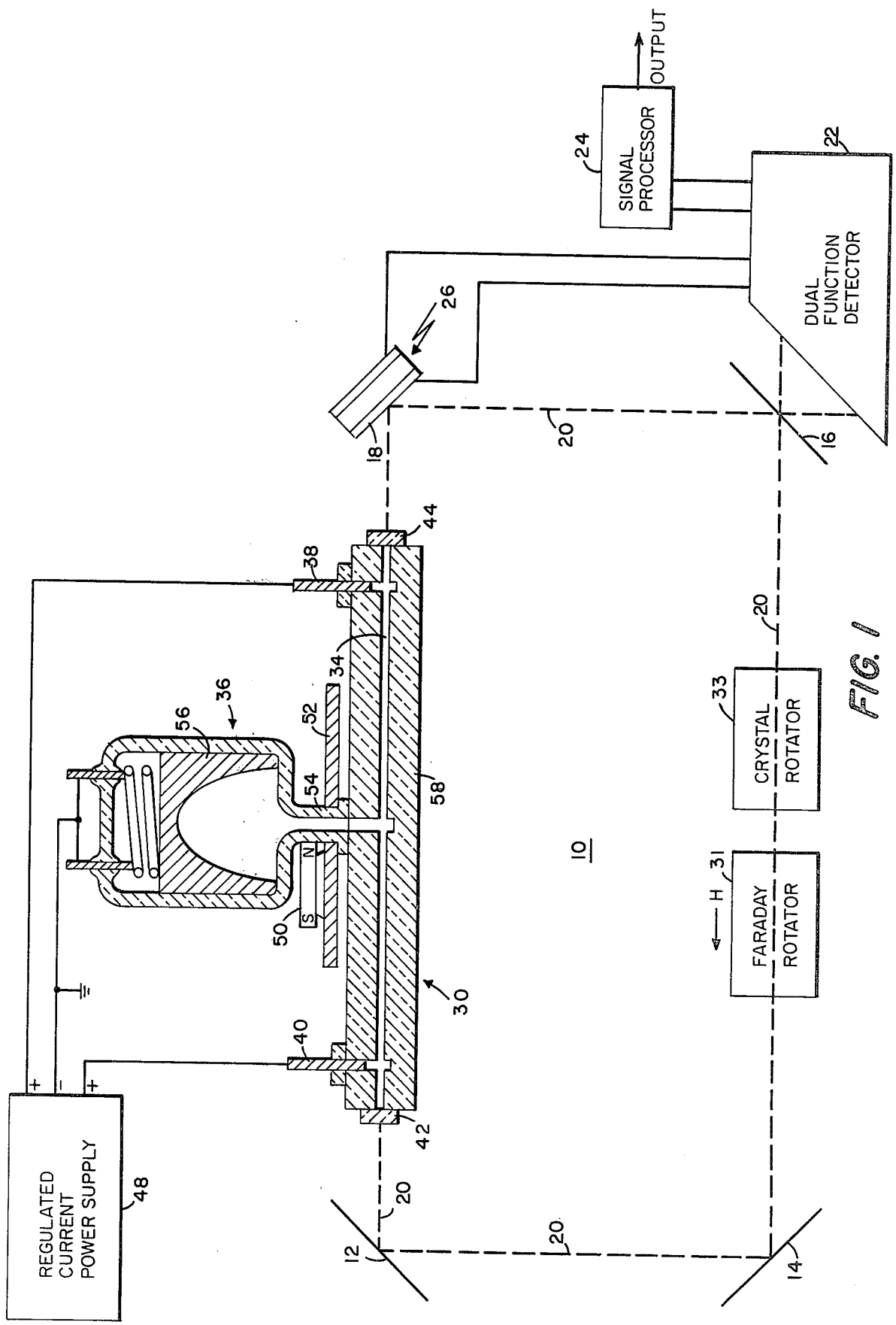
FIG. 1 is a block diagram of a laser gyroscope system embodying the present invention.

Referring now to FIG. 1, which is a block diagram of a laser gyroscope system, there is shown a reentrant optical cavity 10 formed by a plurality of reflectors 12, 14, 16, and 18 which direct waves along a reentrant path 20 through laser 30. One of the mirrors 16 permits the transmission of a small percentage, such as one-half percent of the waves incident thereon, through the mirror to be received by a dual function detector 22. Signals from the waves are detected through photo diodes in detector 22. One output is used for supplying a signal processor 24 whose output is a frequency indicative of the rate of rotation of optical cavity 10.

Figure 3:
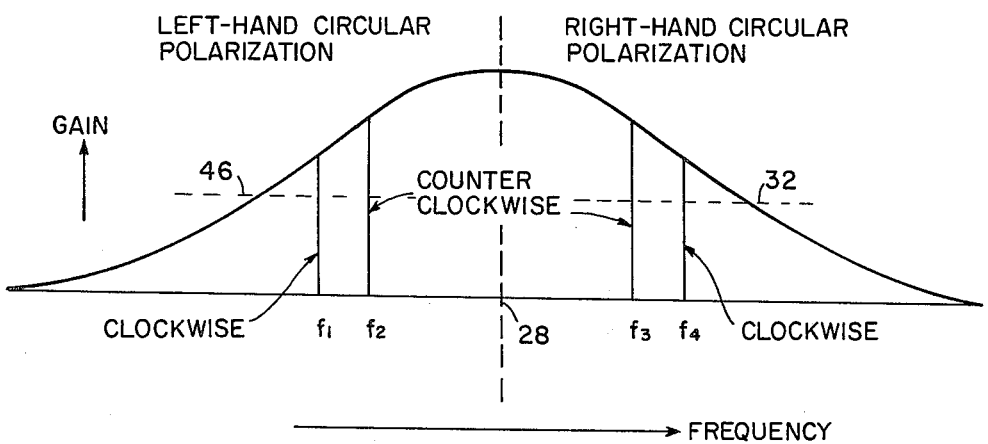
FIG. 3 shows a laser medium gain curve with the positions of the frequencies of the four waves indicated thereon.

Another output of dual function detector 22 drives a piezoelectric crystal 26 supporting mirror 18 to adjust the overall pathlength so that four frequencies F1, F2, F3, and F4 shown in FIG. 3 are positioned respectively on opposite sides of the center frequency 28 of the gain curve of a laser 30. Frequencies F1 and F4 are waves which travel clockwise around cavity 10 while frequencies F2 and F3 are waves which travel counterclockwise around cavity 10. These frequencies are produced due to a Faraday rotation 31 positioned in path 20 which produces a different delay in the waves traveling in the clockwise direction from those traveling in the counterclockwise direction and to a crystal rotator 33 which introduces delays for circularly polarized waves which are different for left-hand circular polarization than for right-hand circular polarization. The principles of such a system for producing four frequencies and for deriving outputs thereof in a detector system are well known and are described, for example, in greater detail in U.S. Pat. No. 3,741,657 issued June 26, 1973 to Keimpe Andringa.

In general, by the use of means in detector 22 which convert circularly polarized waves to linear polarization of different orthogonal senses dependent on the sense of polarization, portions of frequencies F1 and F2 are detected by one photo diode and portions of F2 and F4 are detected by another photo diode with the outputs being the differences between F2-F1 and F4-F3 respectively. The difference in these difference frequencies is counted in signal processor 24 to produce an output indicative of the rotation of cavity 10. In such a system, because the enter frequency 28 is at light frequencies, any variation in the shape or position of the gain curve 32 will cause variations in the output from signal processor 24. Since such gain variations may include variations in the center frequency 28 due, for example, to variations in the gas velocity in the central bore 34 of laser 30, errors in the output signal from signal processor 24 can occur. To reduce such errors laser amplifier 30 is excited by a discharge between a cathode 36 and two anodes 38 and 40 positioned on opposite sides of cathode 36 so that a discharge occurs simultaneously between the cathode 36 traveling along the bore 34 in opposite directions through the gaseous laser gain medium to the anodes 38 and 40. Such a laser discharge permits a light waves traveling along path 20 through windows 42 and 44 crossing the ends of bore 34 to be amplified sufficiently to overcome the losses in the waves traveling around path 20 so that only those waves which travel around the path come back in phase with themselves, build up, and appear as resonant frequencies at detector 22. While frequencies both lower than F1 and higher than F4 would be in phase when they returned, they are below the unity gain level, where cavity losses equal laser gain as shown, for example, at 46 so that these frequencies do not build up on the resonator 10.

By providing a regulated power supply 18 which maintains the current substantially constant between the cathodes 36 and the anodes 38 and 40, low frequency current fluctuations, which are normally encountered in a gas tube discharge such as the helium-neon laser 30, are voided. The time constant of such oscillations is dependent on the external circuit constants of the system, and the gaseous discharge appears as a negative resistance. Hence, sufficient positive resistance can be introduced to damp such oscillations. However, attempts to increase laser gain by increasing the discharge current through the laser, produce high frequency oscillations which external circuit parameters will not control. While the amplitude of such oscillations may not affect normal gas tube discharge uses, it has been found that such discharges can affect the accuracy of the gyros relying on very small frequency shifts to measure rotational rates of the gyro system.

In accordance with this invention there is disclosed the discovery that such high frequency osicllations, for example many megahertz, may be controlled and substantially suppressed by positioning a magnet 50 adjacent the cathode 36. As illustrated herein, magnet 50 is a bar magnet supported on a magnetic shield 52 positioned between magnet 50 and the bore 34 of the laser 30.

While the precise mechanism for suppression of such oscillations is not certain, it is believed that the effect of the magnetic field is to lengthen the mena-free path for electrons in the discharge adjacent the cathode thereby making the internal characteristics of the discharge appear as a less negative, or even positive, resistance in this region. It has been found that the orientation of the magnet can assume a large number of positions in the region of the sidearm bore or neck of the glass envelope 54 of cathode 36. As shown herein, envelope 54 is glass and contains a cathode electrode 56 hollowed, for example, in a cup shape to reduce the density of the current at the cathode surface thereby reducing cathode emission noise. Envelope 54 has a relatively small diamter or neck where it connects with a ceramic block 58 containing the bore 34, and it is in this reduced region that the magnetic field of magnet 30 has been found to be most effective in suppressing high frequency oscillations which transfer with laser gyro accuracy. In general, the magnetic field created by the bar magnet 50 should vary in density and direction throughout a region of the reduced cross section of envelope 54 through which the discharge from electrode 56 flows into the bore 34. Thus, while in some regions a particular magnetic field intensity and/or orientation may be ineffective to suppress discharge oscillations other regions of the magnetic field having a different intensity and/or orienation interacting with other dischrge regions are effective to suppress such oscillations. Under these conditions, it has been found that the regulated supply 48 may be adjusted over a wide range of currents while still maintaining good gain characteristics on the laser 30 or alternatively as the laser 30 ages and the amount of gas in the laser changes stable operation of the system may be obtained.

Figure 2:
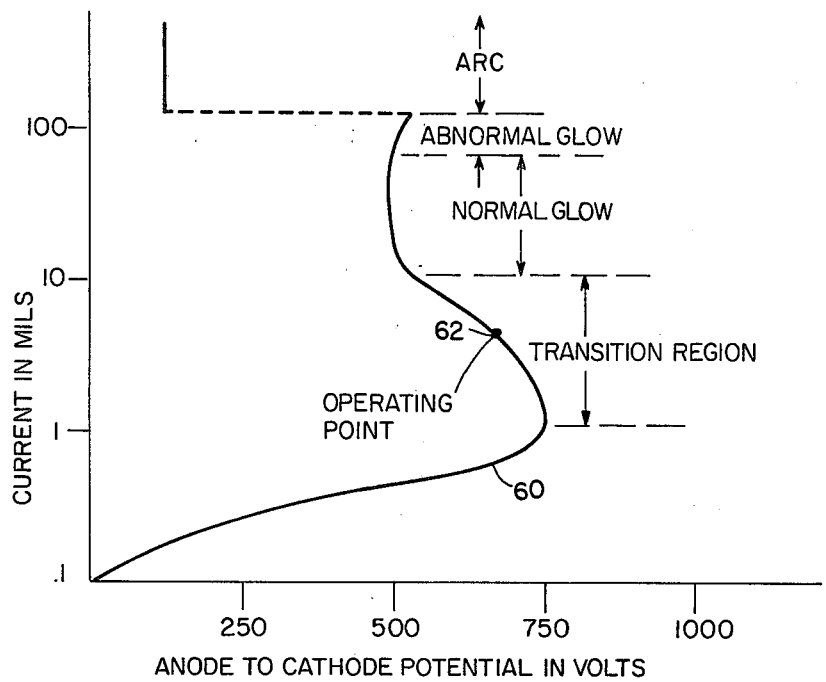
FIG. 2 is a graph of the voltage current relationship of a laser amplifier shown in FIG. 1.

Referring now to FIG. 2 there is shown the discharge voltage-current curve 60 of a gas device of the general shape of the voltage-current discharge encountered in laser 30. The precise shape of the discharge curve 60 of FIG. 2 will change dependent on the size and spacing of the structural elements of the laser 30 as well as the gaseous mixture and pressure and is intended only for the purposes of explanation of the invention.

The operating point 62 of the laser 30 may be, for example, 700 volts and 2½ milliamperes. The laser 30 will have more gain as higher currents are used. However, as current is increased, the negative slope of curve 60 may increase thereby increasing the discharge oscillation potential. If the current is increased to a point where the curve 60 is in the region labeled "normal glow", the laser gain is reduced. Thus, to obtain optimum operating conditions for the laser with the cathode 36 outside the amplifying core 34, it is desirable to provide a stabilizing magnetic field in the cathode region.

The principles of this invention have been found to suppress oscillations in a laser gyro amplifier using a standard helium-neon mixture in a range of pressures around 3 TORR. Preferably, local magnetic field intensities in the cathode discharge region having some values at least in portions of the range from 10 Gauss to 1,000 Gauss are produced by magnet 50. With a laser bore 34 having a diameter of 1 millimeter and a length of about 10 centimeters between the anode electrodes 38 and 40.

This completes the description of the embodiment of the invention illustrated therein. However, many modifications thereof will be apparent to persons skilled in the art without departing from the spirit and scope of the invention. For example, various types of laser gain structures can be used; the system can be used with devices other than the Faraday rotator 31 and crystal rotator 33 for producing the multiple frequencies and other output structures can be used. Accordingly, it is intended that this invention be not limited to the details of the particular embodiment disclosed herein except as defined by the appended claims.

What is claimed is:

1. A laser gyroscope comprising:
   means for providing a reentrant optical path for the propagation of a plurality of waves having respectively different frequencies;
   an amplifying medium in said path comprising a gas; and
   means for stabilizing an electric discharge through said gas comprising means for providing a unidirectional magnetic field in a predetermined region of said discharge which is spaced from said optical path and which has substantially no affect on the portions of said discharge within said optical path.

2. The laser gyroscope in accordance with claim 1 wherein said magnetic field has different intensities in different portions of said discharge.

3. In combination:
   a ring resonator for electromagnetic waves; an amplifier positioned in the path of said electromagnetic waves comprising a gaseous medium;
   means for energizing said amplifier comprising means for producing an electric discharge through said gaseous medium along said path between electrodes positioned outside said path;
   means for producing a substantially constant magnetic field in at least a predetermined region of said discharge outside said path; and
   means for substantially shielding all portions of said discharge in said optical path from said magnetic field.

4. The combination in accordance with claim 3 wherein:
   said magnetic field is provided in a region of said discharge adjacent one of said electrodes.

5. A laser gyroscope comprising:
   a ring resonator having a reentrant path for electromagnetic waves defined by a plurality of reflectors;
   means for amplifying said waves in said path comprising a gaseous mixture having an electrical discharge produced therethrough;
   means for producing a substantially constant magnetic field in a predetermined region of said discharge outside said path;
   said magnetic field having substantially no affect on said discharge in said reentrant path; and
   means coupled to said ring resonator for extracting portions of said wave at each of the frequencies resonant therein.

6. The laser gyroscope in accordance with claim 5 wherein said magnetic field is substantially shielded from the portion of said discharge in said path.

7. In combination:
a ring resonator having an optical path for electromagnetic waves defined by a plurality of reflectors;
an amplifier comprising a gaseous medium positioned in said path;
means for producing a substantially constant magnetic field in a predetermined region of said discharge outside said path; and
means for substantially preventing said magnetic field from affecting said discharge within said optical path comprising means for substantially shielding said optical path from said magnetic field.

8. A laser gyroscope comprising:
a ring resonator having a close path of electromagnetic waves;
a gaseous amplifying medium positiond in said path;
means for producing an electrical discharge in said path through said medium;
means for producing a magnetic field which is applied to said discharge substantially entirely outside said path to stabilize said discharge;
means for shielding said path from said magnetic field; and
means coupled to said ring resonator for extracting portions of each of the frequencies produced therein and for determining the rate of rotation of said resonator.

9. The laser gyroscope in accordance with claim 8 wherein:
said discharge extends between electrodes which are positioned outside said path of said waves.

10. A laser gyroscope having a reentrant optical path for the regenerative propagation of a plurality of electromagnetic waves having respectively different freqencies through a gaseous wave amplifying medium in said path;
means for energizing said medium in said optical path comprising a cathode and a plurality of anodes positioned outside said path;
means for stabilizing an electric discharge between said cathode and anodes comprising means for providing a substantially constant magnetic field in a region of said discharge with said magnetic field being substantially outside said optical path; and
means for substantially shielding said optical path from said magnetic field.

* * * * *

UNITED STATES PATENT OFFICE
CERTIFICATE OF CORRECTION

Patent No. 4,329,057                     Dated May 11, 1982

Inventor(s) Albert N. Zampiello

It is certified that error appears in the above-identified patent and that said Letters Patent are hereby corrected as shown below:

Col. 1, line 52:   change "or" to --of--;

Col. 3, line 26:   change "a" to --at--;

Col. 4, line 20:   change "F2" to --F3--;

Col. 4, line 53:   change "18" to --48--;

Claim 7, Col. 7, after line 8, insert:

--means for producing an electric discharge through said medium along said path between electrodes positioned outside said path;--.

Signed and Sealed this

Twelfth Day of October 1982

[SEAL]

Attest:

GERALD J. MOSSINGHOFF

Attesting Officer    Commissioner of Patents and Trademarks